United States Patent
Bodin et al.

(10) Patent No.: US 8,292,354 B2
(45) Date of Patent: Oct. 23, 2012

(54) B-PILLAR FOR A VEHICLE

(75) Inventors: Hans Bodin, Sodra Sunderbyn (SE); Daniel Berglund, Norrfjarden (SE)

(73) Assignee: Gestamp Hardtech AB, Lulea (SE)

( * ) Notice: Subject to any disclaimer, the term of this patent is extended or adjusted under 35 U.S.C. 154(b) by 341 days.

(21) Appl. No.: 12/734,525

(22) PCT Filed: Nov. 12, 2008

(86) PCT No.: PCT/SE2008/000638
§ 371 (c)(1),
(2), (4) Date: May 6, 2010

(87) PCT Pub. No.: WO2009/064236
PCT Pub. Date: May 22, 2009

(65) Prior Publication Data
US 2010/0308623 A1    Dec. 9, 2010

(30) Foreign Application Priority Data
Nov. 15, 2007   (SE) ..................................... 0702513

(51) Int. Cl.
*B62D 25/04* (2006.01)

(52) U.S. Cl. ......... 296/193.06; 296/187.12; 296/203.03; 280/784

(58) Field of Classification Search ............. 296/187.12, 296/193.06, 303.03, 209; 280/784
See application file for complete search history.

(56) References Cited

U.S. PATENT DOCUMENTS

| | | | |
|---|---|---|---|
| 7,077,920 B2 | 7/2006 | Gehringhoff | |
| 2002/0104591 A1 | 8/2002 | Gehringhoff et al. | |
| 2004/0201256 A1 | 10/2004 | Caliskan et al. | |
| 2005/0023862 A1* | 2/2005 | Saeki | 296/187.12 |
| 2005/0029836 A1* | 2/2005 | Caliskan et al. | 296/193.06 |
| 2009/0242086 A1* | 10/2009 | Thomas et al. | 148/654 |
| 2009/0250967 A1* | 10/2009 | Bodin | 296/187.01 |
| 2010/0101296 A1* | 4/2010 | Handing | 72/342.5 |
| 2010/0231003 A1* | 9/2010 | Okumura et al. | 296/193.06 |
| 2011/0030442 A1* | 2/2011 | Lety et al. | 72/342.94 |
| 2012/0097298 A1* | 4/2012 | Sommer et al. | 148/640 |

* cited by examiner

Primary Examiner — Jason S Morrow
(74) Attorney, Agent, or Firm — Mark P. Stone

(57) ABSTRACT

A B-pillar (12) for a vehicle is fastened between a roof member (13) and a sill member (15) of the vehicle. The pillar has a martensitic structure and the steel has an tensile strength of at least 1300 MPa. Close to the lower fastening portion (14) there is a soft portion (20) with a tensile strength of less than 800 MPa. This soft portion has a height of at least 30 mm, extend over less than ⅓ of the pillar height, and is so positioned that the lower fastening portion is martensitic.

7 Claims, 4 Drawing Sheets

B-PILLAR FOR A VEHICLE

The present United States Patent Application is the United States National Phase of International Patent Application PCT/SE2008/000638, filed on Nov. 12, 2008, and claims the benefit of said PCT International Patent Application pursuant to 35 U.S.C. 365 (c), said PCT International Patent Application claiming the benefit of Swedish Patent Application SE-0702513-3, filed Nov. 15, 2007, pursuant to 35 U.S.C. 365 (b) and 119 (a).

TECHNICAL FIELD

The invention relates to a B-pillar for a vehicle with an upper fastening portion for fastening to a roof member and a lower fastening portion for fastening to a sill member, the main portion of the B-pillar of predominantly martensitic structure having an ultimate strength of at least 1300 MPa and a less strong lower portion of the pillar having an tensile strength of not more than 800 MPa and only a small proportion of martensite.

BACKGROUND TO AND PURPOSE AND OBJECT OF THE INVENTION

The pillar to the rear of the forward door of a vehicle is called a B-pillar. The pillar is substantially intended to provide protection in lateral collisions, and controlled deformation of it in a lateral collision is desired for best possible passenger protection. EP-1 180 470 A1 refers to a B-pillar which has a soft lower portion and promotes a controlled mode of deformation. U.S. Pat. No. 6,820,924 refers to a B-pillar which has two very narrow soft band as deformation triggers at a distance from the lower fastening portion of the pillar.

The object of the invention is to further improve a B-pillar, and in accordance with the invention the less strong portion has a height of at least 30 mm, extends less than ⅓ of total height of the pillar, and is so positioned that the lower fastening portion is predominantly martensitic. The invention is defined by the claims.

DESCRIPTION OF DEPICTED AND PREFERRED EMBODIMENT EXAMPLE OF THE INVENTION

Figure 1:
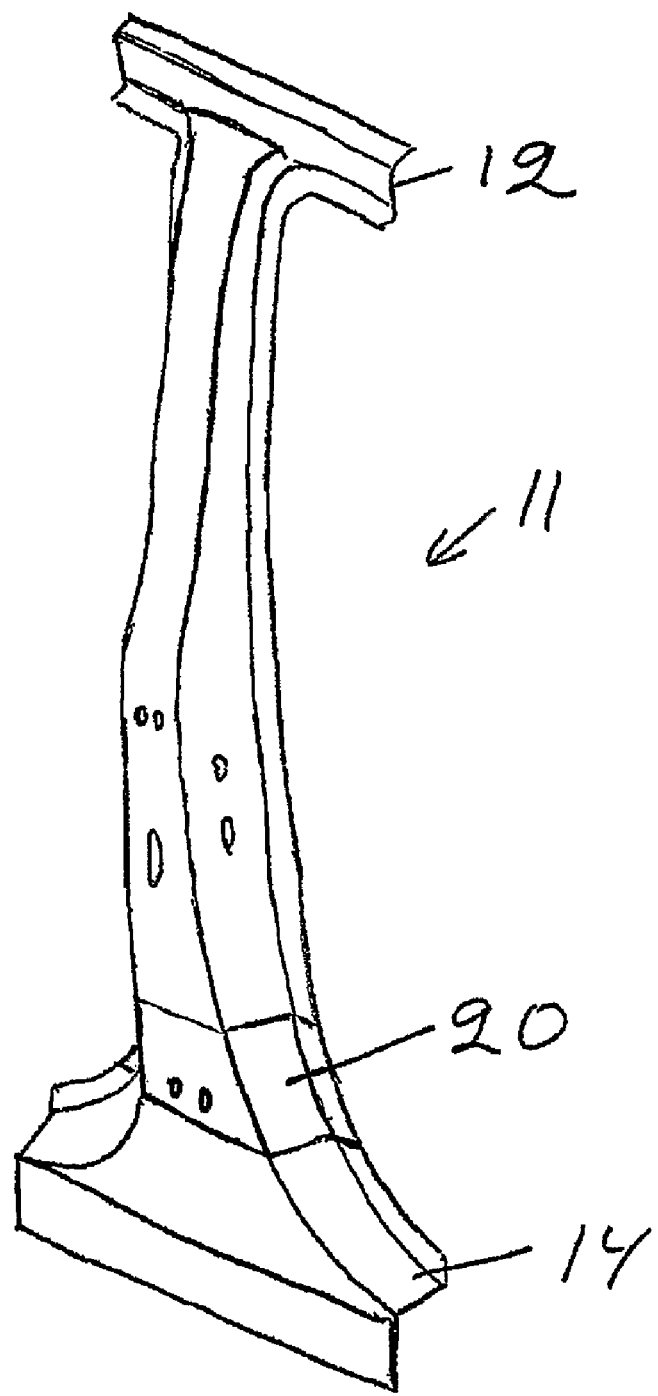
FIG. 1 depicts a B-pillar in perspective as an example of the invention.
Figure 2:
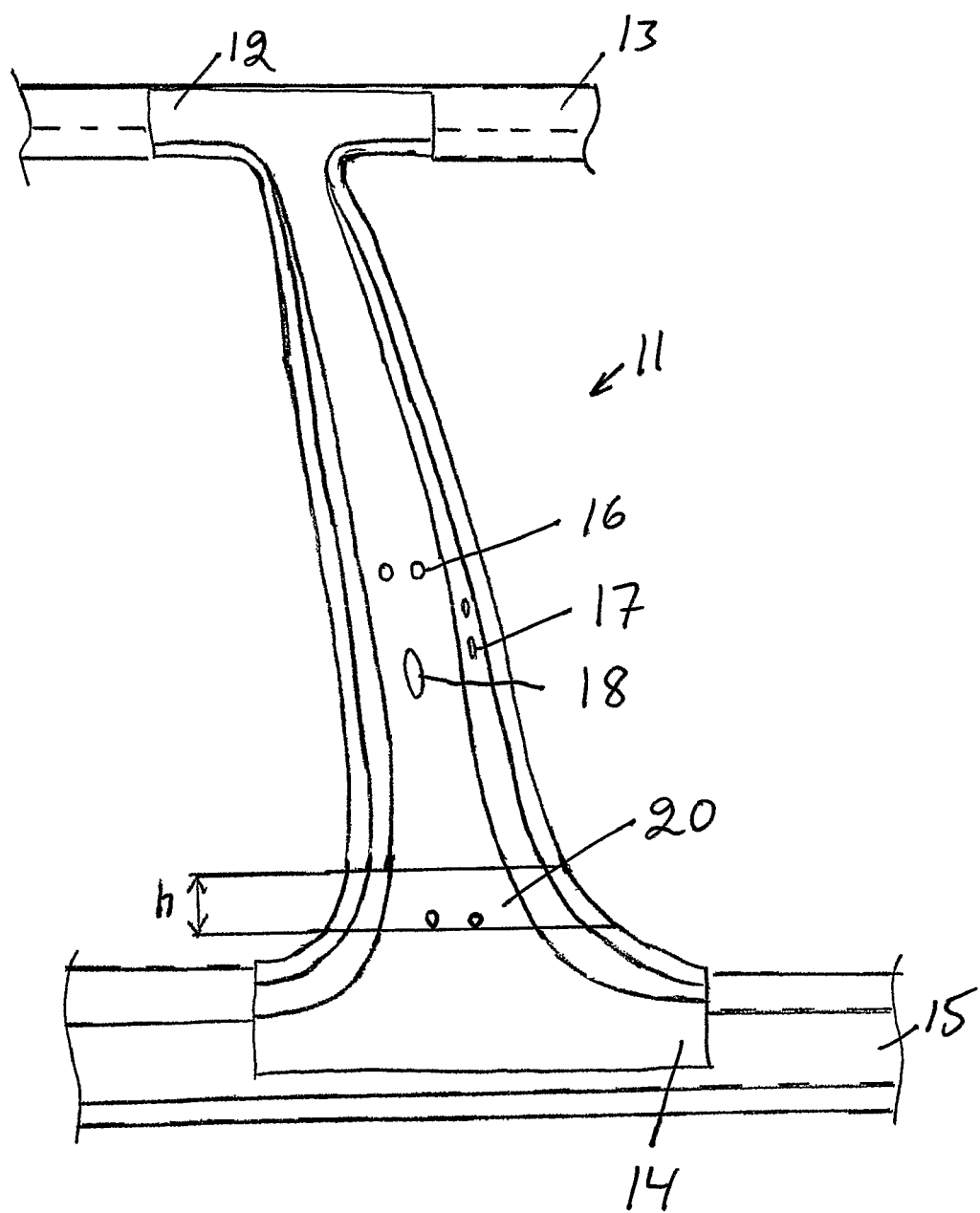
FIG. 2 depicts the same B-pillar in side view.

The B-pillar 11 depicted in the drawings is shaped from a planar steel blank and is of substantially hat-beam shape with varying cross-section along its length. The top of the pillar has a transverse profile constituting a fastening portion 12 adapted to being welded to the vehicle's longitudinal roof member 13. The bottom of the pillar has a transverse profile constituting a fastening portion adapted to being welded to the vehicle's sill member 15. The roof member 13 and the sill member 15 are not depicted in FIG. 1.

The pillar 11 has various necessary holes, e.g. fastening holes 16 for fastening the hinge of the rear door, fastening holes 17 for fastening the striker plate for the lock of the rear door, and a hole 18 for cable leadthrough.

The major length of the pillar is hardened into predominantly martensitic structure and the steel has a tensile strength of at least 1300 MPa, preferably at least 1400 MPa, but the pillar has a softer transverse band 20 with an tensile strength of less than 800 MPa. This band has a different structure, e.g. a mixture of perlite, ferrite, bainite and annealed martensite. The band has a height h of at least 30 mm and extends less than ⅓, or preferably less than ¼, of the total height of the pillar. On both sides of the band there are transition zones to the unannealed martensite structure. The soft band 20 should not reach to the lowest portion of the pillar, since at least the fastening portion 14 to the sill should be predominantly martensitic and of high strength.

Figure 4:
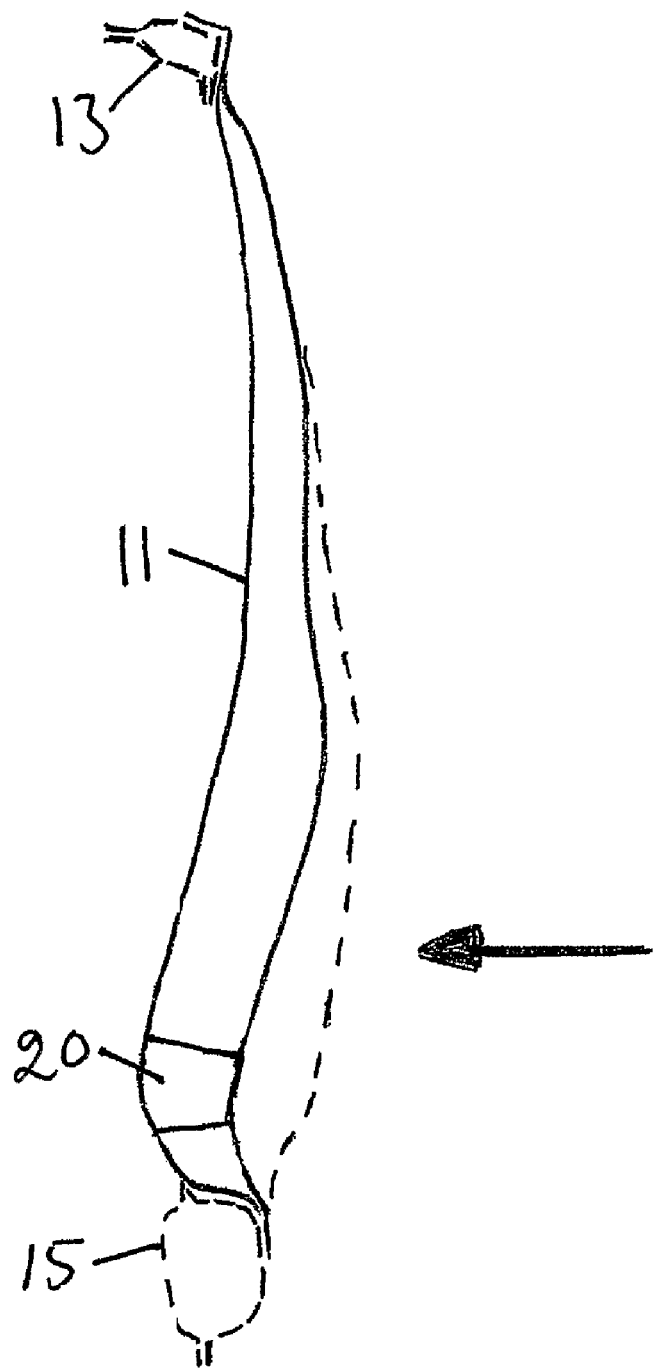
FIG. 4 depicts schematically the deformation of the B-pillar in a lateral collision.

FIG. 4 depicts schematically the deformation of the pillar when subjected to a collision load represented by an arrow in the diagram. The relatively narrow band 20 may have a height of less than 400 mm or less than 200 mm and is situated in the lower half, or preferably the lowest third, of the pillar, and the low positioning of the band promotes the desired deformation behaviour protecting the passenger's hip area without weakening the fastening of the pillar to the sill member. The original state of the pillar is represented by a broken line.

The pillar 11 is with advantage made by the press-hardening method, i.e. it is hot-formed in a cooled pair of tools and maintained in the tools with the tools serving as a fixture until the pillar has hardened. There are various different ways of preventing rapid cooling, and hence preventing hardening, of the band 20. Some ways of preventing rapid cooling of specific portions of the product in the press-hardening method, such as the use of recesses or inserts in the pair of tools or heating of specific parts of the pair of tools, is described in GB 2313848 and U.S. Pat. No. 3,703,093.

In a preferred method, a blank of flat sheet steel is heated in a furnace to austenitic state and moved into a cooled pair of shaping tools and stamped into shape. The shaped pillar is then maintained in the tools until it has hardened into an essentially martensitic structure with a tensile strength of at least 1300 MPa. A portion of each tool adjacent the portion 20 of the pillar is heated and kept at such a temperature that the portion 20 is prevented from rapid cooling and will only reach a tensile strength of less than 800 MPa.

Figure 3:
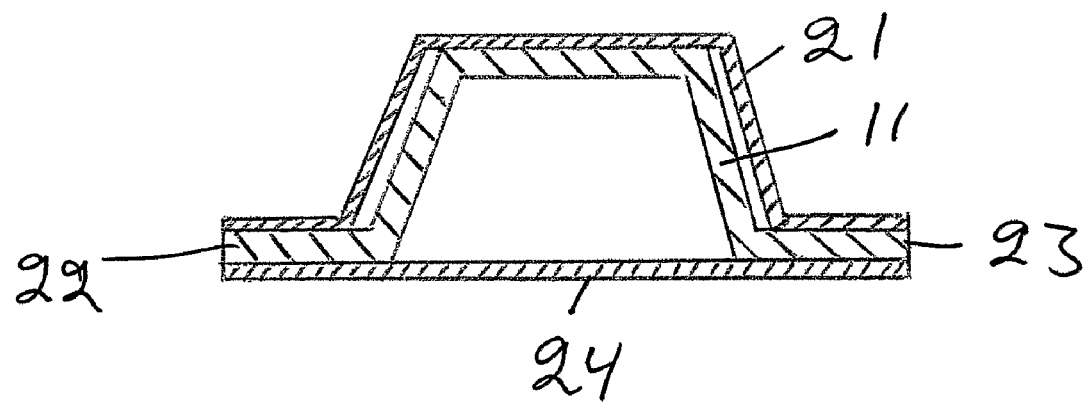
FIG. 3 is a cross-section through the pillar, showing sheetmetal which covers it on the inside and the outside.

The press-hardening method does not result in the surface finish and tolerances desired for painted sheetmetal surfaces. The painted side 21 of the bodywork is therefore usually form-pressed in such a way that it conceals the pillar 11, as illustrated in FIG. 3. The vehicle side 21 is spot-welded or bonded to side flanges 22, 23 of the pillar 11. Thin sheetmetal 24 is also usually fastened on the inside and is thereafter covered with upholstery, but the pillar 11 constitutes the structural B-pillar. On a completed vehicle, the pillar 11 will therefore not be visible and what is visible will be the sheetmetal 21 on the outside and the upholstery on the inside. This unit is then referred to as the B-pillar although it is only the portion 11 which is the structural pillar, although the sheet 24 contributes somewhat to the strength by preventing the hat profile from flatten out.

The invention claimed is:

1. A B-pillar for a vehicle, comprising an upper fastening portion (12) for fastening to a roof member (13), and a lower fastening portion (14) for fastening to a sill member (15), the main portion of the B-pillar being of predominantly martensitic structure with a tensile strength of at least 1300 MPa and a less strong lower portion (20) of the pillar having a tensile strength of not more than 800 MPa, characterised in that the less strong portion (20) has a height of more than 30 mm, extends less than ⅓ of total height of the pillar, and is so positioned that the lower fastening portion (14) is predominantly martensitic.

2. A B-pillar according to claim 1, characterised in that the less strong portion (14) has a height of less than ¼ of the total height of the pillar.

3. A B-pillar according to claim 1, characterised in that the less strong portion has a height of between 50 and 200 mm.

4. A B-pillar according to claim 1, characterised in that the main portion of the B-pillar has a tensile strength of at least 1400 MPa.

5. A method of shaping a B-pillar for a vehicle by hot-shaping an austenitic blank of sheet steel in a cooled pair of tools and keeping the shaped pillar in the cooled pair of tools until it has hardened into an essentially martensitic structure with a tensile strength of at least 1300 MPa, characterised in
that a portion (20) with a height of 30-400 mm is prevented from rapid cooling such that it will reach a tensile strength of less than 800 MPa and said portion is positioned at the lower half of the pillar above a bottom portion (14), which will have a tensile strength of at least 1300 MPa.

6. A B-pillar according to claim 2, characterised in that the main portion of the B-pillar has a tensile strength of at least 1400 MPa.

7. A B-pillar according to claim 3, characterised in that the main portion of the B-pillar has a tensile strength of at least 1400 MPa.

\* \* \* \* \*